United States Patent
Bae et al.

(10) Patent No.: US 8,023,401 B2
(45) Date of Patent: Sep. 20, 2011

(54) APPARATUS AND METHOD FOR FAST FOURIER TRANSFORM/INVERSE FAST FOURIER TRANSFORM

(75) Inventors: Hyoung Oh Bae, Daejeon (KR); Dae Ho Kim, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 122 days.

(21) Appl. No.: 12/543,842

(22) Filed: Aug. 19, 2009

(65) Prior Publication Data

US 2010/0149963 A1 Jun. 17, 2010

(30) Foreign Application Priority Data

Dec. 17, 2008 (KR) .................. 10-2008-0128696

(51) Int. Cl.
*H04J 11/00* (2006.01)
(52) U.S. Cl. ........................................ 370/210
(58) Field of Classification Search .................. 370/210, 370/203; 708/100, 200, 400, 403, 404
See application file for complete search history.

(56) References Cited

U.S. PATENT DOCUMENTS

| | | | | |
|---|---|---|---|---|
| 5,987,005 A * | 11/1999 | Fertner et al. | ................. | 370/210 |
| 6,230,176 B1 * | 5/2001 | Mizutani | ...................... | 708/404 |
| 6,401,162 B1 * | 6/2002 | Nasserbakht | ..................... | 711/5 |
| 6,421,696 B1 * | 7/2002 | Horton | .......................... | 708/404 |
| 6,434,583 B1 * | 8/2002 | Dapper et al. | ................ | 708/409 |
| 7,761,495 B2 * | 7/2010 | Jaber | .............................. | 708/403 |
| 2007/0180011 A1 * | 8/2007 | Lee et al. | ...................... | 708/400 |

FOREIGN PATENT DOCUMENTS

| KR | 1020060087656 | 8/2006 |
|---|---|---|
| KR | 1020060087657 | 8/2006 |

* cited by examiner

*Primary Examiner* — Chi Pham
*Assistant Examiner* — Robert Lopata
(74) *Attorney, Agent, or Firm* — Nelson Mullins Riley & Scarborough LLP; EuiHoon Lee, Esq.

(57) ABSTRACT

An FFT/IFFT apparatus and method are provided. The FFT/IFFT apparatus includes a storage unit, a first FFT/IFFT unit, a second FFT/IFFT unit, and a third FFT/IFFT unit. The storage unit has as many addresses as the number of bits of input data. The first FFT/IFFT unit sequentially stores half of the input data in the storage unit, performs a first-point FFT/IFFT operation while sequentially receiving the other half of the input data, and stores the first-point FFT/IFFT operation result in the storage unit. The second FFT/IFFT unit performs a second-point FFT/IFFT operation on the first-point FFT/IFFTed data, and stores the second-point FFT/IFFT operation result in the storage unit. The third FFT/IFFT unit performs a third-point FFT/IFFT operation on the second-point FFT/IFFTed data, and stores the third-point FFT/IFFT operation result in the storage unit.

14 Claims, 8 Drawing Sheets

| | Alpha0 | | | | Alpha1 | | |
|---|---|---|---|---|---|---|---|
| | Beta0 | Beta1 | Beta2 | | Beta0 | Beta2 | Beta3 |
| | Add0<br>Memory 1024<br>Add1023 | Add0<br>Memory 1024<br>Add1023 | Add0<br>Memory 1024<br>Add1023 | Gamma0 | Add0<br>Memory 1024<br>Add1023 | Add0<br>Memory 1024<br>Add1023 | Add0<br>Memory 1024<br>Add1023 |
| | Add0<br>Memory 1024<br>Add1023 | Add0<br>Memory 1024<br>Add1023 | Add0<br>Memory 1024<br>Add1023 | Gamma1 | Add0<br>Memory 1024<br>Add1023 | Add0<br>Memory 1024<br>Add1023 | Add0<br>Memory 1024<br>Add1023 |
| | Add0<br>Memory 1024<br>Add1023 | Add0<br>Memory 1024<br>Add1023 | Add0<br>Memory 1024<br>Add1023 | Gamma2 | Add0<br>Memory 1024<br>Add1023 | Add0<br>Memory 1024<br>Add1023 | Add0<br>Memory 1024<br>Add1023 |
| | Add0<br>Memory 1024<br>Add1023 | Add0<br>Memory 1024<br>Add1023 | Add0<br>Memory 1024<br>Add1023 | Gamma3 | Add0<br>Memory 1024<br>Add1023 | Add0<br>Memory 1024<br>Add1023 | Add0<br>Memory 1024<br>Add1023 |

APPARATUS AND METHOD FOR FAST FOURIER TRANSFORM/INVERSE FAST FOURIER TRANSFORM

CROSS-REFERENCE TO RELATED APPLICATIONS

This application claims priority under 35 U.S.C. §119 to Korean Patent Application No. 10-2008-0128696, filed on Dec. 17, 2008, the disclosure of which is incorporated herein by reference in its entirety.

TECHNICAL FIELD

The present disclosure relates to an apparatus and method for Fast Fourier Transform (FFT)/Inverse Fast Fourier Transform (IFFT), and in particular, to an FFT/IFFT apparatus and method that can perform an FFT/IFFT operation on input data by using a single memory with an address corresponding to data to be FFT/IFFTed.

BACKGROUND

On the basis of the orthogonality between subcarriers, Orthogonal Frequency Division Multiplexing (OFDM) systems perform a symbol mapping operation, a subcarrier mapping operation and an IFFT/FFT operation to transmit signals.

A conventional OFDM system uses a 256, 1024 or 2048-point FFT/IFFT process, and a conventional FFT processor uses a pipeline scheme that connects radix-2 or radix-4 butterfly units, memories and multipliers in series to process data sequentially.

The pipeline scheme provides a high processing speed. However, the pipeline scheme has a limitation in that the total chip size increases because a memory, a multiplier and a Read Only Memory (ROM) must be provided at each stage.

Moreover, a recent 3rd Generation Partnership Project Long Term Evolution (3GPP LTE) system uses a 24576-point FFT process for downlink Random Access CHannel (RACH) transmission and thus requires a very large amount of computation and a very large memory capacity. So the conventional FFT processor is impossible to use in the 3GPP LTE system.

SUMMARY

In general aspect, an FFT/IFFT apparatus includes a storage unit having as many addresses as the number of bits of input data, a first FFT/IFFT unit sequentially storing half of the input data in the storage unit, performing a first-point FFT/IFFT operation while sequentially receiving the other half of the input data, and storing the first-point FFT/IFFT operation result in the storage unit, a second FFT/IFFT unit performing a second-point FFT/IFFT operation on the first-point FFT/IFFTed data, and storing the second-point FFT/IFFT operation result in the storage unit and a third FFT/IFFT unit performing a third-point FFT/IFFT operation on the second-point FFT/IFFTed data, and storing the third-point FFT/IFFT operation result in the storage unit.

In another general aspect, an FFT/IFFT method includes storing half of the input data in a first region of a storage unit that includes the first region and a second region that include a plurality of memories with a certain size in a matrix configuration, performing a first-point FFT/IFFT operation on the half of the input data stored and the other half of the input data, and storing the first-point FFT/IFFT operation result in the storage unit, performing a second-point FFT/IFFT operation on the first-point FFT/IFFTed data, and updating the storage unit by the second-point FFT/IFFT operation result and performing a third-point FFT/IFFT operation on the second-point FFT/IFFTed data, and again updating the storage unit by the third-point FFT/IFFT operation result.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF EMBODIMENTS

The following description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

Hereinafter, a 24576-point FFT/IFFT apparatus according to an exemplary embodiment of the present invention will be described with reference to FIGS. 1 and 2.

Figure 1:
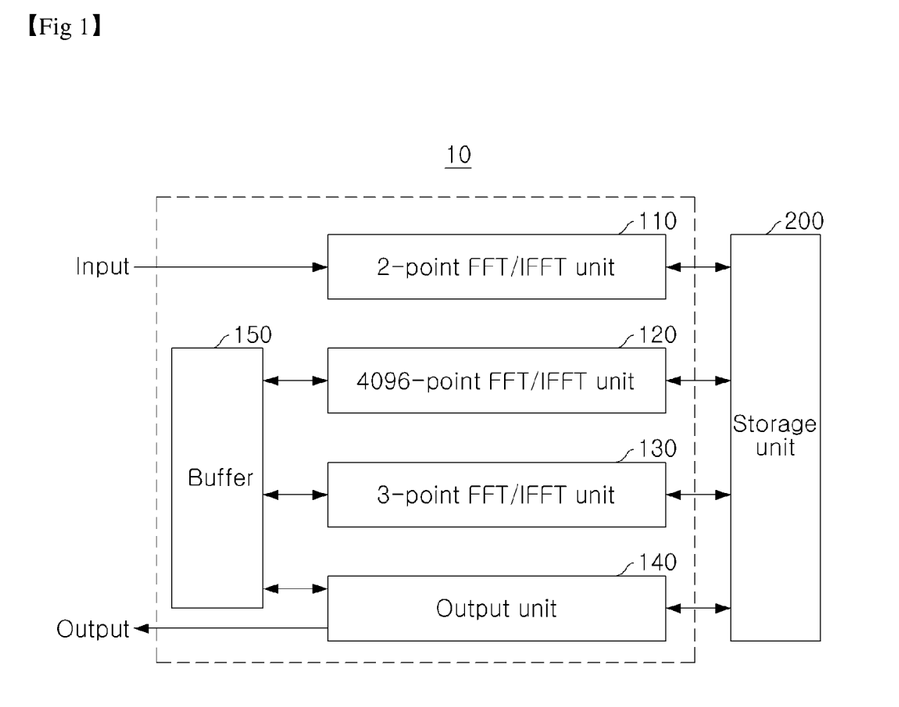
FIG. 1 is a block diagram of an exemplary 24576-point FFT/IFFT apparatus of the present invention.

FIG. 1 is a block diagram of an exemplary 24576-point FFT/IFFT apparatus of the present invention. FIG. 2 is a diagram illustrating an exemplary structure of a storage unit of the 24576-point FFT/IFFT apparatus.

Referring to FIG. 1, a 24576-point FFT/IFFT apparatus 10 includes a storage unit 200, a 2-point FFT/IFFT unit 110, a 4096-point FFT/IFFT unit 120, a 3-point FFT/IFFT unit 130, and an output unit 140.

Figure 2:
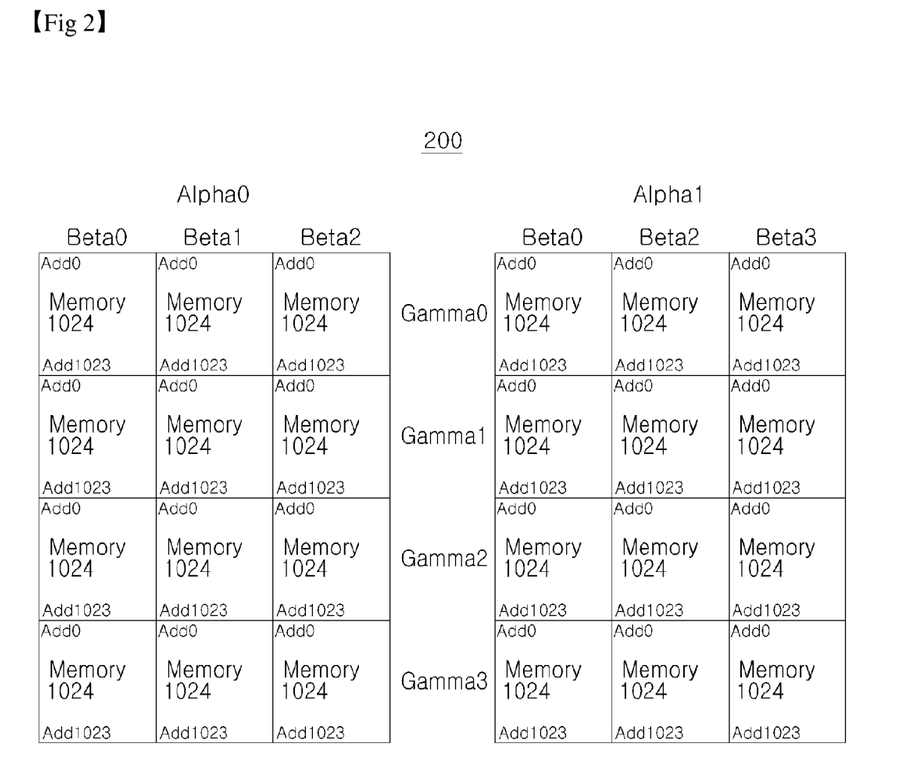
FIG. 2 is a diagram illustrating an exemplary structure of a storage unit of the 24576-point FFT/IFFT.

Referring to FIG. 2, the storage unit 200 may be configured to include a memory which has 1024 addresses constituted of alpha regions, gamma rows and beta columns. The following description is given of an exemplary case where the memory of the storage unit 200 has regions Alpha0 and Alpha1, each region including Gamma0, Gamma1, Gamma2 and Gamma3 rows and Beta0, Beta1 and Beta2 columns.

The 2-point FFT/IFFT unit 110 sequentially stores half of the input data in the storage unit 200, performs a 2-point FFT/IFFT operation while sequentially receiving the other half of the input data and stores the operation results in the storage unit 200. Herein, the 2-point FFT/IFFT unit 110 may use a radix-2 engine to perform the 2-point FFT/IFFT operation.

Specifically, the 2-point FFT/IFFT unit 110 sequentially stores the $0^{th}$ to $12287^{th}$ data in the region Alpha0 of the storage unit 200, and performs a 2-point FFT/IFFT on the data stored in the region Alpha0 of the storage unit 200 the $12288^{th}$ to $24575^{th}$ data while receiving the $12288^{th}$ to $24575^{th}$ data. Also, the 2-point FFT/IFFT unit 110 sequentially stores two 2-point FFT/IFFTed output data respectively at the corresponding locations on the gamma row and beta column of the regions Alpha0 and Alpha 1.

The 4096-point FFT/IFFT unit 120 reads 2-point FFT/IFFTed data from the storage unit 200, performs a 4096-point FFT/IFFT operation on the 2-point FFT/IFFTed data, and stores the operation results at the corresponding locations in the storage unit 200. Herein, the 4096-point FFT/IFFT unit 120 may use a radix-4 engine to perform the 4096-point FFT/IFFT operation by performing six stages of 4-point FFT/IFFT operations on the respective data.

Specifically, the 4096-point FFT/IFFT unit 120 reads a total of four data from the corresponding addresses of the respective memories located at the respective beta columns and gamma rows of the storage unit 200, performs six stages of $4^6$ (=4096)-point FFT/IFFT operations on the four data using a radix-4 engine, and stores the operation results at the corresponding locations in the storage unit 200.

The 3-point FFT/IFFT unit 130 performs a 3-point FFT/IFFT operation on the data, which are stored in the storage unit 200 after 2-point and 4096-point FFT/IFFT operations, and stores the operation results at the corresponding locations in the storage unit 200. Herein, the 3-point FFT/IFFT unit 130 may use a radix-3 engine to perform the 3-point FFT/IFFT operation.

Specifically, the 3-point FFT/IFFT unit 130 reads a total of three data from the corresponding addresses of the respective memories located at the respective beta columns and gamma rows of the storage unit 200, performs a 3-point FFT/IFFT operation on the three data using a radix-3 engine, and stores the operation results at the corresponding locations in the storage unit 200.

The output unit 140 may use a Cooley-Tukey algorithm to output the data stored in the storage unit 200 in a certain sequence, thereby outputting the 24576-point FFT/IFFTed results. Since the sequence of the data stored in the storage unit 200 has changed in the respective operations, the 24576-point FFT/IFFTed data cannot be obtained if the stored data are outputted randomly. Therefore, it is necessary to control the data output sequence by the output unit 140.

A method for the output unit 140 to output the 24576-point FFT/IFFTed data stored in the storage unit 200 will be described later with reference to FIG. 8.

The 2-point FFT/IFFT unit 110, the 4096-point FFT/IFFT unit 120 and the 3-point FFT/IFFT unit 130 of the 24576-point FFT/IFFT apparatus 10 repeatedly read the data from the corresponding addresses of the corresponding memory of the storage unit 200 and store the results in the corresponding addresses of the corresponding memory of the storage unit 200, which will be described later in detail with reference to FIGS. 4 to 8.

Meanwhile, the 24576-point FFT/IFFT apparatus 10 may further include a buffer 150 that temporarily stores the data generated during the operations of the 2-point FFT/IFFT unit 110, the 4096-point FFT/IFFT unit 120 and the 3-point FFT/IFFT unit 130. Also the 24576-point FFT/IFFT apparatus 10 may further include another storage unit having the same size as the storage unit 200, which enables that the 24576-point FFT/IFFT apparatus 10 performs 24576-point FFT/IFFT operation on the subsequent input data in real time while performing a 24576-point FFT/IFFT operation on the first input data when the data are continuously inputted, In this way, the present invention can perform an FFT operation by means of a Cooley-Tukey algorithm that recursively divides an n-sized Discrete Fourier Transform (DFT) into an n1-sized DFT and an n2-sized DFT (n=n1×n2) and combines the results at the time'O(n)' using a divide-and-conquer algorithm.

Hereinafter, an exemplary 24576-point FFT/IFFT method of the 24576-point FFT/IFFT apparatus 10 will be described with reference to FIG. 3.

Figure 3:
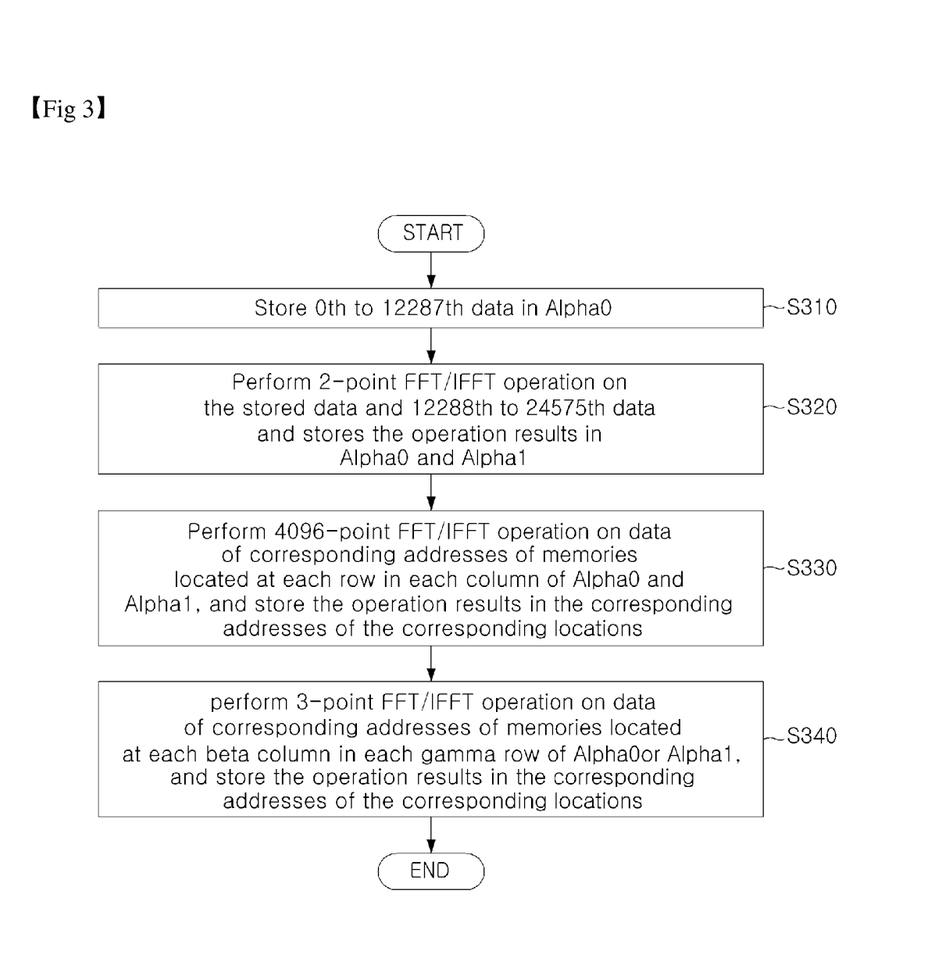
FIG. 3 is a flow chart illustrating an exemplary 24576-point FFT/IFFT method.

FIG. 3 is a flow chart illustrating an exemplary 24576-point FFT/IFFT method.

Referring to FIG. 3, the 24576-point FFT/IFFT apparatus 10 stores the $0^{th}$ to $12287^{th}$ data among all the 24576 data in the region Alpha0 of the storage unit 200 in S310.

In S320, the 24576-point FFT/IFFT apparatus 10 performs a 2-point FFT/IFFT operation on the data stored in the region Alpha0 and the $12288^{th}$ to $24575^{th}$ data, and stores the operation results in the regions Alpha0 and Alpha1, respectively.

In S330, the 24576-point FFT/IFFT apparatus 10 reads data from the corresponding addresses of the memory located at the rows Gamma0, Gamma1, Gamma2 and Gamma3 in each beta column, performs a 4096-point FFT/IFFT operation on the data, and stores the operation results at the corresponding locations in the memories.

Specifically, the 24576-point FFT/IFFT apparatus 10 reads four data from the corresponding locations of the respective rows in the regions Alpha0 and Alpha1 of the storage unit 200, performs six stages of 4096-point FFT/IFFT operations on the four data by means of a radix-4 engine, and updates the operation results at the corresponding locations in the storage unit 200.

In S340, the 24576-point FFT/IFFT apparatus 10 reads data from the corresponding addresses of the memory located at the columns Beta0, Bet1 and Beta2 in each gamma row of the region Alpha0 or Alpha1, performs a 3-point FFT/IFFT operation on the data, and stores the operation results at the corresponding locations in the memories.

Specifically, the 24576-point FFT/IFFT apparatus 10 reads three data from the corresponding locations of the respective columns in the region Alpha0, performs a 3-point FFT/IFFT operation on the three data by means of a radix-3 engine, and updates the operation results at the corresponding locations in the storage unit 200. Also, the 24576-point FFT/IFFT apparatus 10 reads three data from the corresponding locations of the respective columns in the region Alpha1 of the storage unit 200, performs a 3-point FFT/IFFT operation on the three data by means of a radix-3 engine, and updates the operation results at the corresponding locations in the storage unit 200.

Hereinafter, the software algorithm and the operations of the 2-point FFT/IFFT unit 110, the 4096-point FFT/IFFT unit 120 and the 3-point FFT/IFFT unit 130 will be described with reference to FIGS. 4 to 8.

Figure 4:
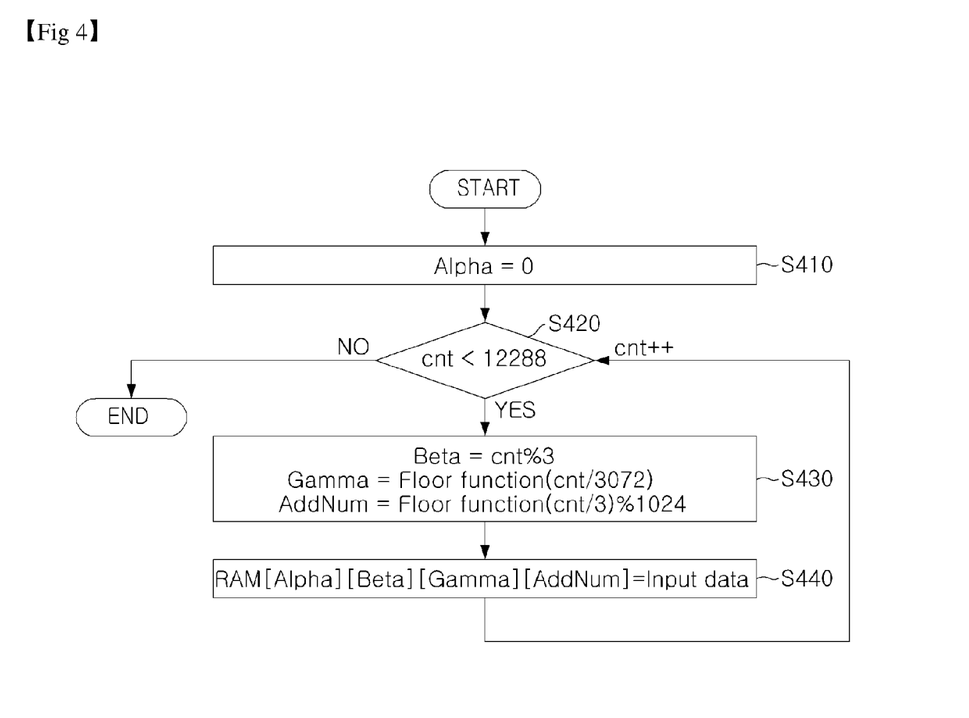
FIG. 4 is a flow chart illustrating an exemplary process for a 2-point FFT/IFFT unit to store half of the input data in the storage unit.

FIG. 4 is a flow chart illustrating an exemplary process for the 2-point FFT/IFFT unit 110 to store half of the input data in the storage unit 200.

Referring to FIG. 4, the 2-point FFT/IFFT unit 110 designates the region Alpha0 in S410.

In S420, the 2-point FFT/IFFT unit 110 determines whether a 'cnt' parameter, which increases from 0 according to data input, is smaller than 12288. Herein, the initial value of the 'cnt' parameter is '0', which counts the $0^{th}$ to $12287^{th}$ data.

In S430, the 2-point FFT/IFFT unit 110 performs a certain operation on the 'cnt' parameter to designate the memory located at the gamma row and the beta column in the storage unit 200, which is to store input data, and the address of the corresponding memory.

In S440, the 2-point FFT/IFFT unit 110 stores the input data at the designated address of the corresponding memory.

Thereafter, by increasing the 'cnt' parameter by a factor of 1, the 2-point FFT/IFFT unit 110 repeats S420 to S440 until the 'cnt' parameter reaches 12287.

Hereinafter, a process of performing a 2-point FFT/IFFT operation on the $0^{th}$ to $12287^{th}$ data stored in the storage unit 200 through the process of FIG. 4 and the $12288^{th}$ to $24575^{th}$ data subsequently inputted will be described with reference to FIG. 5.

Figure 5:
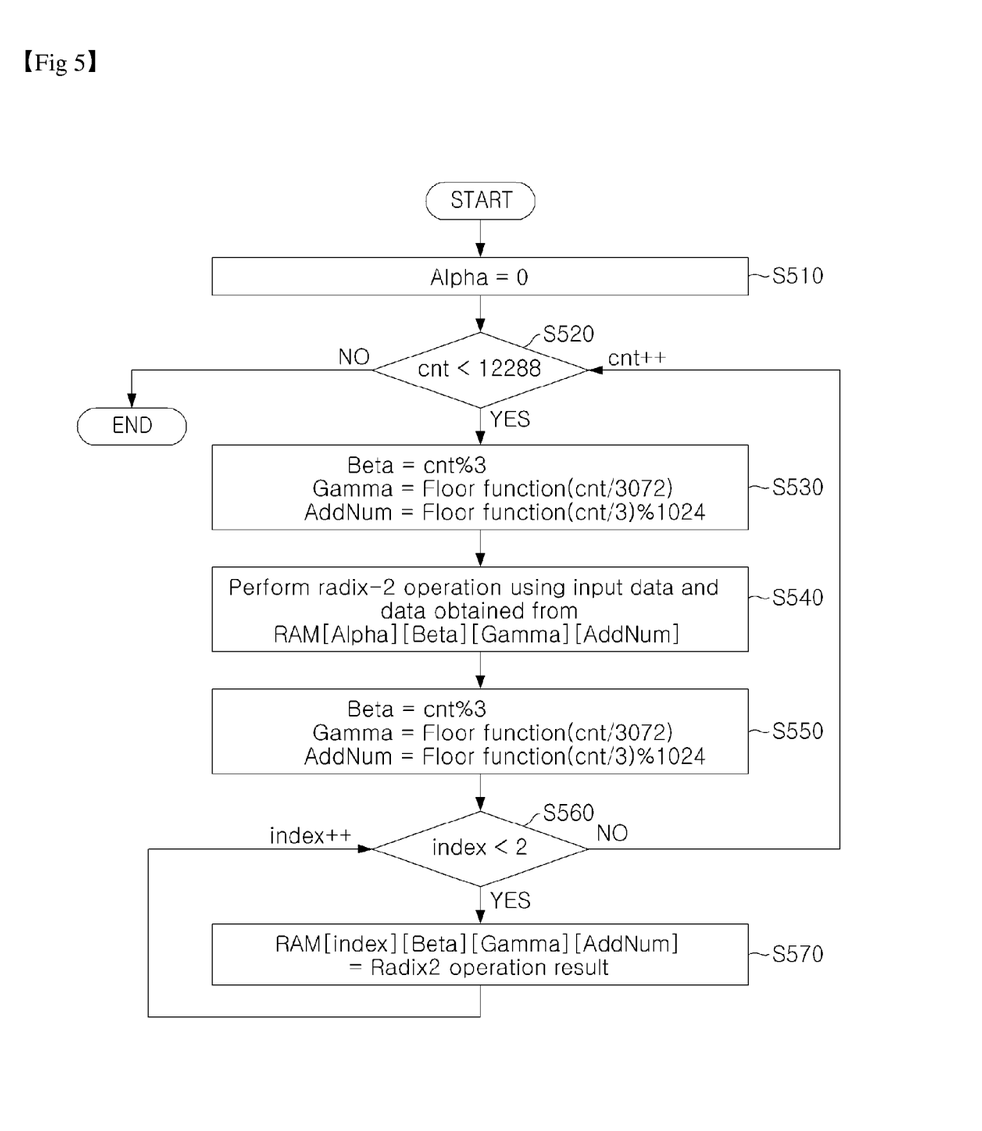
FIG. 5 is a flow chart illustrating an exemplary process for the 2-point FFT/IFFT unit to perform a 2-point FFT/IFFT operation.

FIG. 5 is a flow chart illustrating an exemplary process for the 2-point FFT/IFFT unit 110 to perform a 2-point FFT/IFFT operation.

Referring to FIG. 5, in S510, the 2-point FFT/IFFT unit 110 designates the region Alpha0 of the storage unit 200.

In S520, while increasing the 'cnt' parameter according to data input, the 2-point FFT/IFFT unit 110 determines whether the 'cnt' parameter is smaller than 12288. At this point, the $12288^{th}$ to $24575^{th}$ data are inputted, because the $0^{th}$ to $12287^{th}$ data are already stored in the storage unit 200.

In S530, the 2-point FFT/IFFT unit 110 performs a certain operation on the 'cnt' parameter to designate the memory located at the gamma row and the beta column of the storage unit 200 and the addresses for reading the data of the corresponding memory.

In S540, the 2-point FFT/IFFT unit 110 performs a 2-point FFT/IFFT operation on the $0^{th}$ to $12287^{th}$ data stored at the designated addresses of the corresponding memory of the storage unit 200 and the $12288^{th}$ to $24575^{th}$ data inputted.

In S550, the 2-point FFT/IFFT unit 110 designates the corresponding addresses of the memory located at the gamma row and the beta column of the storage unit 200 to store the 2-point FFT/IFFTed data.

Herein, there are two of the 2-point FFT/IFFTed result data. Therefore, the 2-point FFT/IFFT unit 110 determines whether an index parameter for indicating the order of the alpha regions to store the two data respectively in the region Alpha0 and Alpha1 is smaller than 2 in S560.

In S570, the 2-point FFT/IFFT unit 110 stores the 2-point FFT/IFFTed data at the designated addresses of the memory located at the gamma row and the beta column of the regions Alpha0 and Alpha1.

Thereafter, by increasing the 'cnt' parameter by a factor of 1, the 2-point FFT/IFFT unit 110 repeats S520 to S570 until the 'cnt' parameter reaches 12287.

Hereinafter, a process of performing a 4096-point FFT/IFFT operation on the 2-point FFT/IFFTed data obtained through the processes of FIGS. 4 and 5 will be described with reference to FIG. 6.

Figure 6:
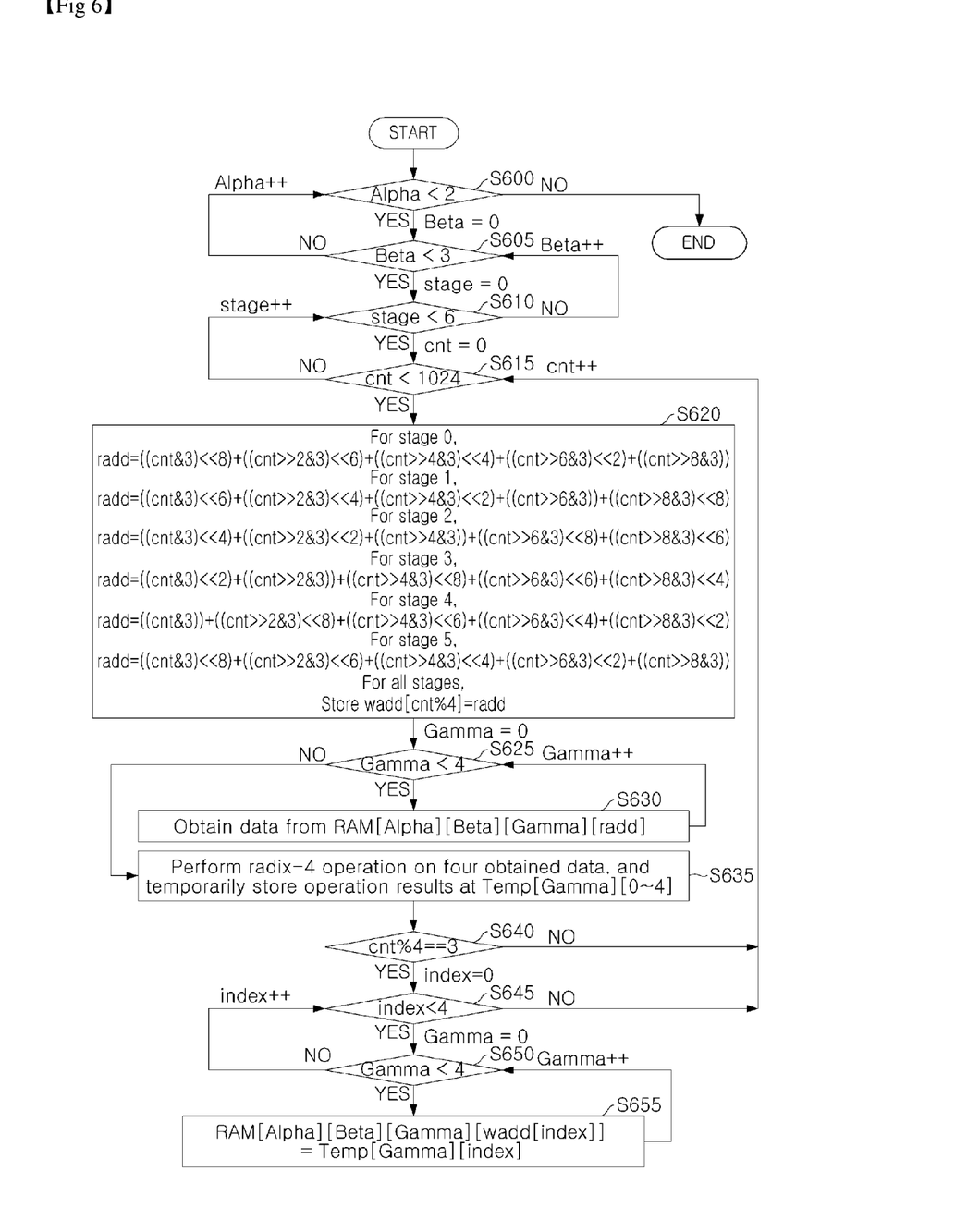
FIG. 6 is a flow chart illustrating an exemplary process for a 4096-point FFT/IFFT unit to perform a 4096-point FFT/IFFT operation.

FIG. 6 is a flow chart illustrating an exemplary process for the 4096-point FFT/IFFT unit 120 to perform a 4096-point FFT/IFFT operation. Herein, an Alpha parameter is the order of the alpha region, a Beta parameter is the order of the beta column, a Gamma parameter is the order of the gamma row, a Stage parameter is the order of the six stages of the 4-point FFT/IFFT, a 'cnt' parameter is a parameter for designating an address, and the initial value of each parameter is 0.

Referring to FIG. 6, the 4096-point FFT/IFFT unit 120 determines whether the Alpha parameter is smaller than 2 in S600.

If the Alpha parameter is smaller than 2, the 4096-point FFT/IFFT unit 120 proceeds to S605. In S605, the 4096-point FFT/IFFT unit 120 determines whether the Beta parameter is smaller than 3.

If the Beta parameter is smaller than 3, the 4096-point FFT/IFFT unit 120 proceeds to S610. In S610, the 4096-point FFT/IFFT unit 120 determines whether the Stage parameter is smaller than 6.

If the Stage parameter is smaller than 6, the 4096-point FFT/IFFT unit 120 proceeds to S615. In S615, the 4096-point FFT/IFFT unit 120 determines whether the 'cnt' parameter is smaller than 1024.

In S620, the 4096-point FFT/IFFT unit 120 designates the corresponding address among the 1024 addresses of the memory according to the Stage parameter by using the 'cnt' parameter. That is, the 4096-point FFT/IFFT unit 120 may designate the corresponding addresses of the memory located at the corresponding column of the corresponding region of the storage unit 200 through S600 to S620.

In S625, the 4096-point FFT/IFFT unit 120 determines whether the Gamma parameter is smaller than 4.

If the Gamma parameter is smaller than 4, the 4096-point FFT/IFFT unit 120 reads data from the designated addresses of the memory of the rows Gamma0, Gamma1, Gamma2 and Gamma3 located at the corresponding column of the corresponding region of the storage unit 200, by increasing the Gamma parameter from 0 to 3, and temporarily stores the data in the buffer 150 in S625 to S635.

If the remainder of the 'cnt' parameter divided by 4 is 3 in S640, the 4096-point FFT/IFFT unit 120 stores the data temporarily stored in the buffer 150 at the predesignated addresses of the memory stored in the buffer 150, which are designated by the Alpha, Beta and Gamma parameters, by increasing the index parameter and the Gamma parameter by a factor of 1 from 0 to 3 in S645 to S655.

That is, the 4096-point FFT/IFFT unit 120 stores the 4096-point FFT/IFFTed data again at the corresponding addresses of the corresponding memory retrieved in order to perform the 4096-point FFT/IFFT operation.

On the other hand, if the remainder of the 'cnt' parameter divided by 4 is not 3, or if the index parameter is not smaller than 4, the 4096-point FFT/IFFT unit 120 increases the 'cnt' parameter by a factor of 1 and returns to S615 to repeat S615 to S655, or increases the Stage parameter by a factor of 1 and returns to S610.

Herein, the 4096-point FFT/IFFT unit 120 may perform the 4096-point FFT/IFFT operation by repeating S610 to S655 over six stages to the data located at the designated address of the memory designated by the same Alpha, Beta and Gamma parameters, and performs the repetition until the process of FIG. 6 is performed on all the data stored in the storage unit 200.

Hereinafter, a process of performing a 3-point FFT/IFFT operation on the 2-point and 4096-point FFT/IFFTed data stored in the storage unit 200 will be described with reference to FIG. 7.

Figure 7:
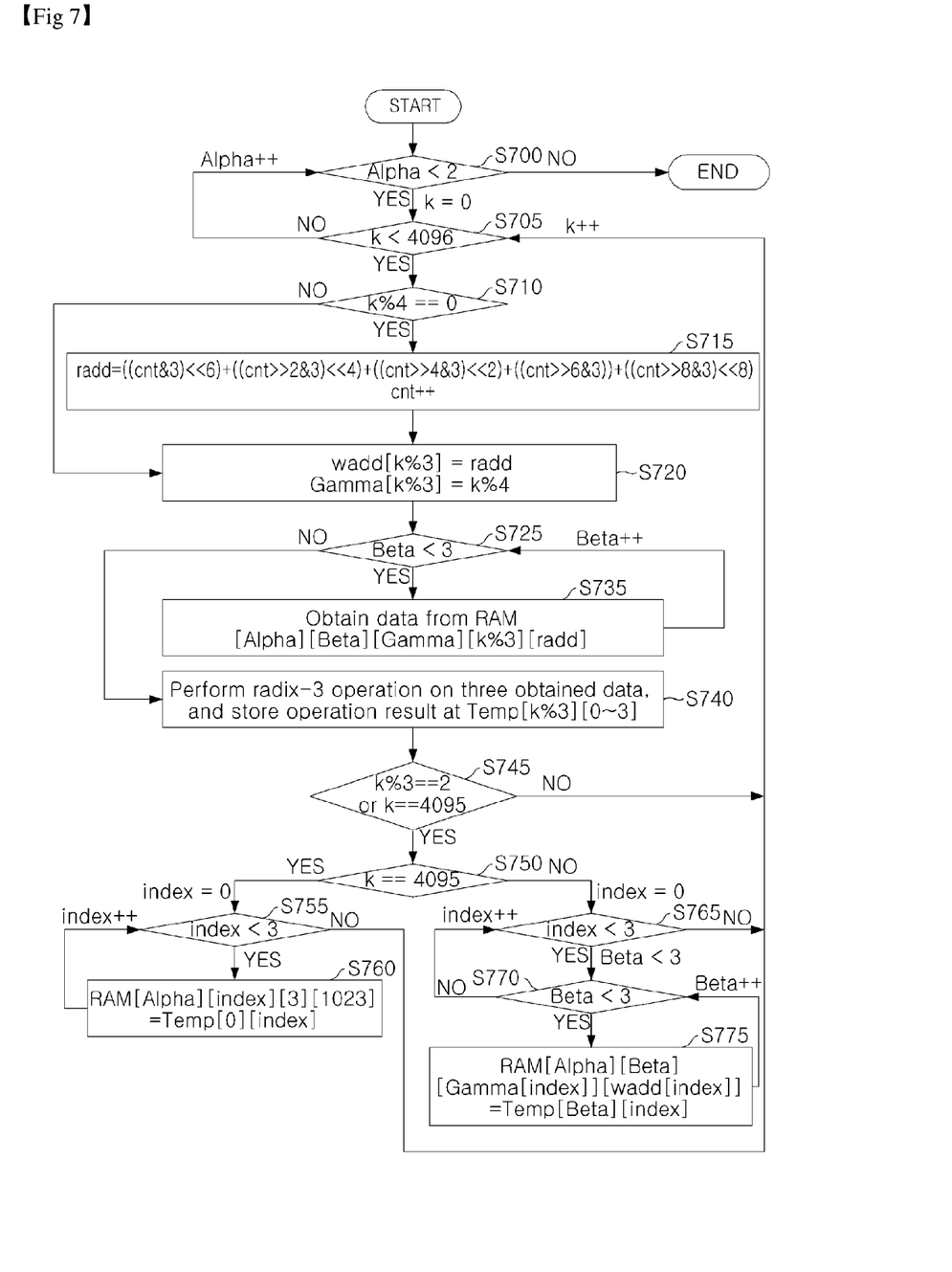
FIG. 7 is a flow chart illustrating an exemplary process for a 3-point FFT/IFFT unit to perform a 3-point FFT/IFFT operation.

FIG. 7 is a flow chart illustrating an exemplary process for the 3-point FFT/IFFT unit 130 to perform a 3-point FFT/IFFT operation. Herein, an Alpha parameter is the order of the alpha region, a Beta parameter is the order of the beta column, a Gamma parameter is the order of the gamma row, a 'k' parameter is a parameter for designating an address, and the initial value of each parameter is 0.

Referring to FIG. 7, the 3-point FFT/IFFT unit 130 determines whether the Alpha parameter is smaller than 2 in S700.

If the Alpha parameter is smaller than 2, the 3-point FFT/IFFT unit 130 130 determines whether the 'k' parameter is smaller than 4096 iln S705.

If the 'k' parameter is smaller than 4096, the 3-point FFT/IFFT unit 130 determines whether the 'k' parameter is the multiple of 4 in S710, that is, whether the remainder of the 'k' parameter divided by 4 is 0.

If the 'k' parameter is the multiple of 4, the 3-point FFT/IFFT unit 130 generates an address through a bit shift operation in S715.

In S720, the 3-point FFT/IFFT unit 130 temporarily stores the generated address and the remainder of the 'k' parameter divided by 4 in the buffer 150.

In S725 to S740, the 3-point FFT/IFFT unit 130 reads data from the generated address of the memory, which is located at the column designated by the Beta parameter and the row designated by the remainder of the 'k' parameter divided by 4 in the region designated by the Alpha parameter, performs a 3-point FFT/IFFT operation on the data by increasing the Beta parameter by a factor of 1 from 0 to 2, and temporarily stores the operation results in the buffer 150.

In S745, the 3-point FFT/IFFT unit 130 determines whether the remainder of the 'k' parameter divided by 3 is 2 or the 'k' parameter is 4095.

If the 'k' parameter is not 4095, the 3-point FFT/IFFT unit 130 stores the data, which are temporarily stored in the buffer 150, at the generated address of the memory, which is located at the column designated by the Beta parameter and the row designated by the index parameter in the region of the storage unit 200 designated by the Alpha parameter, by increasing the Beta parameter and the Gamma parameter from 0 to 2 or 3 in S765 to S775.

On the other hand, if the 'k' parameter is 4095, the 3-point FFT/IFFT unit 130 stores the 3-point FFT/IFFTed data, which are temporarily stored in the buffer 150, at the 1023 address of the memory, which is located at the fourth row of the column designated by the index parameter in the region of the storage unit 200 designated by the Alpha parameter, by increasing the index parameter from 0 to 2 in S755 and S760.

Herein, if the 'k' parameter is 4095, the 3-point FFT/IFFT unit 130 may store the 3-point FFT/IFFTed data other than the data of the last address of the memory located at the fourth row, through S765 to S775.

Hereinafter, a process of sequentially outputting the data, which are 24576-point FFT/IFFTed and stored in the storage unit 200 through the processes of FIGS. 4 to 7, will be described with reference to FIG. 8.

Figure 8:
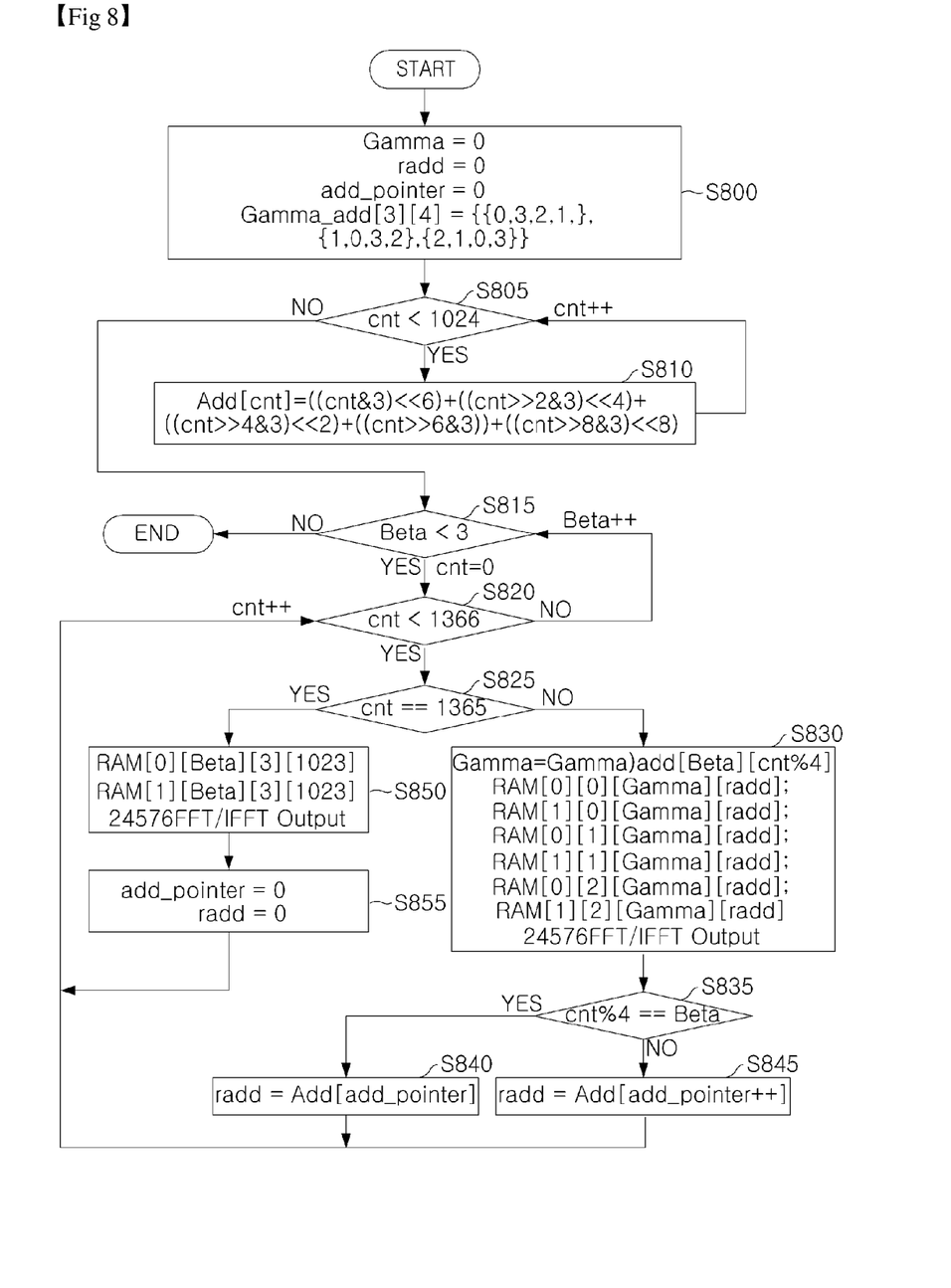
FIG. 8 is a flow chart illustrating an exemplary process for an output unit to output the 24576-point FFT/IFFTed data from the storage unit.

FIG. 8 is a flow chart illustrating an exemplary process for the output unit 140 to output the 24576-point FFT/IFFTed data from the storage unit 200.

Referring to FIG. 8, the output unit 140 initializes a Gamma parameter, an 'radd' parameter, and an add_pointer parameter, and defines the initial value of a Gamma_add[3][4] array in S800.

In S805 and S810, the output unit 140 generates a corresponding address indicating an address of the memory and inputs the corresponding address generated to an Add[cnt] array, by increasing a 'cnt' parameter by a factor of 1 from 0 to 1023.

Then, the output unit 140 initializes the 'cnt' parameter to 0 and repeats S830 to S855 by increasing the 'cnt' parameter from 0 to 1365 in each step of a Beta parameter being 0 2.

If the 'cnt' parameter is smaller than 1366 and is not 1365, the output unit 140 proceeds to S830. In S830, the output unit 140 outputs the data from the address designated by the 'radd' parameter, of the memory located at the Gamma row calculated by Equation (1) below, in the column and the region of the storage unit 200 designated according to (0, 0), (1, 0), (0, 1), (1, 1), (0, 2), (1, 2) of the Alpha and Beta parameters.

$$\text{Gamma}=\text{Gamma\_add}[\text{Beta}][\text{cnt \%4}] \quad (1)$$

In S835, the output unit 140 determines whether the remainder of the 'cnt' parameter divided by 4 is equal to the Beta parameter. If the remainder of the 'cnt' parameter divided by 4 is equal to the Beta parameter, the output unit 140 proceeds to S840. In S840, the output unit 140 substitutes the 'radd' parameter by the first address stored in the Add[cnt] array. Thereafter, the output unit 140 increases the 'cnt' parameter by a factor of 1 and returns to S820.

On the other hand, if the remainder of the 'cnt' parameter divided by 4 is not equal to the Beta parameter, the output unit 140 proceeds to S845. In S845, the output unit 140 substitutes the 'radd' parameter by the next address of the Add[cnt] array. Thereafter, the output unit 140 increases the 'cnt' parameter by a factor of 1 and returns to S820.

Meanwhile, if the 'cnt' parameter is 1365, the output unit 140 proceeds to S850. In S850, the output unit 140 sequentially outputs the data stored in the $1023^{rd}$ address of the memory having an Alpha parameter value of 0 and a Beta parameter value of 3 and the data stored at the $1023^{rd}$ address of the memory having an Alpha parameter value of 1 and a Beta parameter value of 3.

In S855, the output unit 140 initializes the add_pointer parameter and the 'radd' parameter to 0. Thereafter, the output unit 140 returns to S820.

In summary, through the process of FIG. 8, the output unit 140 sequentially outputs the data stored in the memories located at the column Beta0 indicated by the Beta parameter '0' in the region Alpha0 indicated by the Alpha parameter '0', and sequentially outputs the data stored in the memories located at the column Beta0 indicated by the Beta parameter '0' in the region Alpha1 indicated by the Alpha parameter '1'. Likewise, the output unit 140 sequentially outputs the data stored in the memories located at the column Beta1 in the region Alpha0, and sequentially outputs the data stored in the memories located at the column Beta1 in the region Alpha1. Also, the output unit 140 sequentially outputs the data stored in the memories located at the column Beta2 in the region Alpha0, and sequentially outputs the data stored in the memories located at the column Beta2 in the region Alpha1.

As described above, the present invention can increase the processing speed by performing an FFT/IFFT operation through a divide and conquer process using a Cooley-Tukey algorithm, and make it possible to use a single memory with addresses corresponding to the number of data to be FFT/IFFTed.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for Fast Fourier Transform (FFT)/Inverse Fast Fourier Transform (IFFT) comprising:
    a storage unit having as many addresses as the number of bits of input data;
    a first FFT/IFFT unit sequentially storing a first half of the input data in the storage unit, sequentially receiving a second half of the input data, performing a first-point FFT/IFFT operation on the first half of the input data and the second half of the input data, and storing the first-point FFT/IFFT operation result in the storage unit;

a second FFT/IFFT unit performing a second-point FFT/IFFT operation on the first-point FFT/IFFTed data, and storing the second-point FFT/IFFT operation result in the storage unit; and a third FFT/IFFT unit performing a third-point FFT/IFFT operation on the second-point FFT/IFFTed data, and storing the third-point FFT/IFFT operation result in the storage unit.

2. The apparatus of claim 1, wherein the storage unit comprises first and second regions, each of which includes a plurality of memories with a certain size in a matrix configuration according to radix operation sizes of the first and second FFT/IFFT units.

3. The apparatus of claim 2, wherein the first FFT/IFFT unit sequentially stores the first half of the input data at each column and row of the first region of the storage unit, performs the first-point FFT/IFFT operation on the first half of the input data stored and the second half of the input data sequentially received, and sequentially stores the first-point FFT/IFFT operation result at each column and row of the first and second regions.

4. The apparatus of claim 2, wherein the second FFT/IFFT unit performs the second-point FFT/IFFT operation on the data stored at the address of the memory located at each column and row of the storage unit, and stores the second-point FFT/IFFT operation result at the corresponding address of the storage unit.

5. The apparatus of claim 2, wherein the third FFT/IFFT unit performs the third-point FFT/IFFT operation on the data stored at the address of the memory located at each row and column of the first and second regions of the storage unit, and stores the third-point FFT/IFFT operation result at the corresponding location of the storage unit.

6. The apparatus of claim 2, further comprising an output unit that outputs the data stored in the storage unit in a certain sequence by means of a Cooley-Tukey algorithm so that the input data sequentially correspond to the first, second and third-point FFT/IFFTed data.

7. The apparatus of claim 1, further comprising at least one buffer that temporarily stores the data generated during each of the operations of the first, second and third FFT/IFFT units.

8. The apparatus of claim 1, further comprising a second storage unit that has the same size as the storage unit, wherein the second storage unit is used to perform the FFT/IFFT operations in real time.

9. A method for Fast Fourier Transform (FFT)/Inverse Fast Fourier Transform (IFFT) comprising:

storing a first half of input data in a first region of a storage unit that includes a first region and a second region, each of which includes a plurality of memories with a certain size in a matrix configuration;

receiving a second half of the input data, performing a first-point FFT/IFFT operation on the first half of the input data stored and the second half of the input data, and storing the first-point FFT/IFFT operation result in the storage unit;

performing a second-point FFT/IFFT operation on the first-point FFT/IFFTed data, and updating the storage unit by the second-point FFT/IFFT operation result; and performing a third-point FFT/IFFT operation on the second-point FFT/IFFTed data, and updating the storage unit for the second time by the third-point FFT/IFFT operation result.

10. The method of claim 9, wherein the storing of the first-point FFT/IFFT operation result in the storage unit comprises:

sequentially performing the first-point FFT/IFFT operation on the first half of the input data stored in the first region and the second half of the input data; and storing the first-point FFT/IFFT operation result at the corresponding columns, rows and addresses of the first and second regions.

11. The method of claim 9, wherein the updating of the storage unit by the second-point FFT/IFFT operation result comprises:

reading four data stored at the designated addresses in each row of the first and second regions, and performing the second-point FFT/IFFT operation on the four data through stages of FFT/IFFT operations; and updating the corresponding location of the storage unit by the second-point FFT/IFFTed data.

12. The method of claim 9, wherein the updating of the storage unit for the second time by the third-point FFT/IFFT operation result comprises:

reading data stored at the corresponding location in each column of the first region, performing the third-point FFT/IFFT operation on the data, and updating the corresponding location of the storage unit by the third-point FFT/IFFT operation result; and reading data stored at the corresponding location in each column of the second region, performing the third-point FFT/IFFT operation on the data, and again updating the corresponding location of the storage unit by the third-point FFT/IFFT operation result.

13. The method of claim 9, further comprising:

sequentially reading/outputting the second updated data from the corresponding location of the storage unit of the respective sequential rows in the respective sequential columns while alternating the first region with the second region.

14. The method of claim 9, further comprising:

temporarily storing the data generated in each of the FFT/IFFT operations, before the completion of each of the FFT/IFFT operations, by using the data read from the storage unit.

* * * * *